Figure 1:
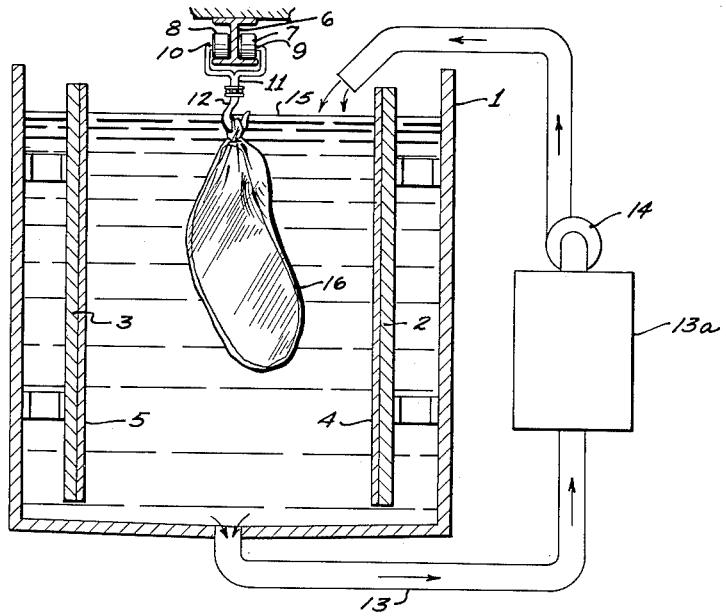

April 3, 1962 — C. A. MILLS — 3,027,734
CHILLING AND FREEZING SYSTEMS
Filed March 18, 1960

INVENTOR.
CLARENCE A. MILLS,
BY
ATTORNEYS.

3,027,734
CHILLING AND FREEZING SYSTEMS
Clarence A. Mills, Cincinnati, Ohio, assignor to Reflectotherm, Inc., Cincinnati, Ohio, a corporation of Ohio
Filed Mar. 18, 1960, Ser. No. 16,010
5 Claims. (Cl. 62—375)

My invention relates to chilling and freezing systems and particularly to such systems involving chilling and freezing of food products such as meats.

It is an object of my invention to combine a system of short infrared ray radiant cooling with a deeper ultra long wave length infrared radiant cooling.

To distinguish short infrared ray radiant cooling from ultra long wave infrared radiant cooling, I employ a polyethylene bagging material enclosing the hunks of meat or other food products which effectively transmit ultra long wave infrared rays of wave lengths of 30 microns or longer. This same bagging material is for all practical purposes effectively transparent to infrared rays in the wave length area below 30 microns. So in the specification and claims which follow, when I use the term "short infrared rays" I am defining rays of a length of less than 30 microns and when I use the term "long infrared rays" I am defining wave lengths of greater than and substantially greater than 30 microns.

Spray chilling or freezing with or without plastic bagging of the products has been used extensively in the food preparation field for poultry carcass chilling and freezing. Its chief handicaps, particularly in product freezing, have been difficulty in freezing the product centers after the outer shells have been solidly frozen. These solidly frozen outer shells form insulating layers which make it difficult and greatly accentuates the time element required for final freezing of the center portions.

I have previously described in copending applications, Serial No. 742,123 and Serial No. 764,644, now Pat. No. 2,966,780, applications of the principles of quantum mechanics in the radiant cooling in depth and the through and through freezing or solidification of liquid products such as chocolate moulds and coatings. This has involved the exposure of the products to carbon blacked cold plate coils kept from icing or fogging so as not to inhibit the reception of the long ultra violet rays by being constantly bathed in low dew point air. The heat removal from such solidifying products is largely through radiant channels directly from product to cold plate coils with air cooling of the products being insignificantly small under the conditions pertaining. Such radiant cooling facilitates particularly the removal and absorption of the ultra long wave length radiations emanating from throughout the material as it solidifies and its latent heat is liberated.

As an improvement in efficiency in such radiant cooling and removal of the large increments of latent heat liberated in solidification or freezing, I have applied the procedure of using long wave receptive carbon black coated cold plates subjected to either a spray of antifreezing liquid such as cold glycol or brine water, or to actual immersion of the products to be chilled or frozen and the cold absorption plates, in a solution bath of antifreeze liquid.

In the modifications of this new process, I have illustrated diagrammatically:

In FIGURE 1, I have indicated one type of conveyor in which the food products being chilled or frozen and the cold plates are submerged in cold glycol or brine water antifreeze solution.

Figure 2:
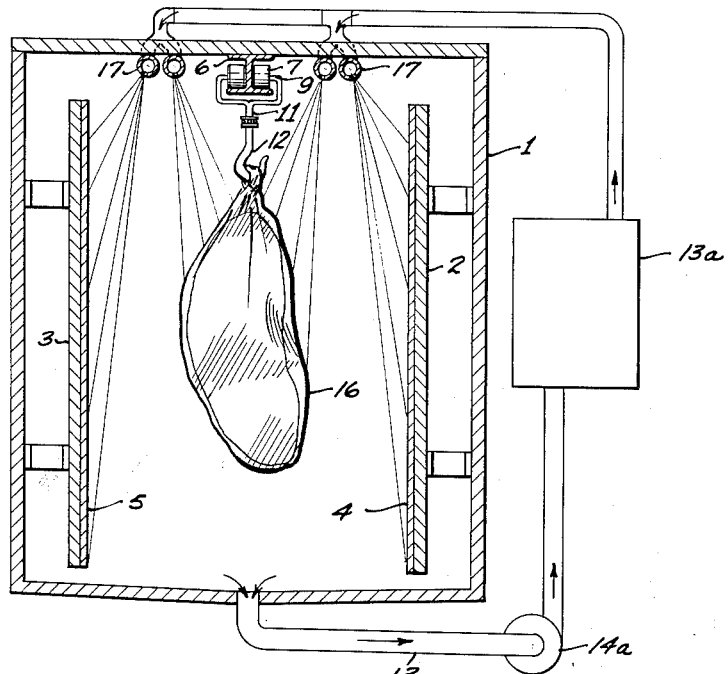

In FIGURE 2 I have illustrated a modified type of freezing conveyor in which, instead of submerging the food products and cold plates in a bath of liquid, I have provided instead a voluminous spray of liquid.

Thus in FIGURE 1 I have shown the container or tank 1 having cold plates 2 and 3 on both sides of the space through which the food products, to be frozen are conveyed. The cold plates have the carbon black coatings 4 and 5 on the surfaces facing the conveyor space.

The conveyor is shown as formed by an I beam 6 having pivoted rollers 7 and 8, the pivots or axles being formed by rods 9 and 10 formed integrally with a clamp member 11 which supports a vertically journaled hook member 12 to which a hunk of meat is secured and suspended.

From the bottom of the tank a pipe 13 is extended to a cooler or refrigerating apparatus 13a from which the cooled glycol or brine water is pumped with a pump 14 and circulated into the tank where it discharges into the bath indicated as being maintained at the level 15.

The hunk of meat on the conveyor is enclosed in a polyethylene bag 16 which is transparent to both short wavelength rays emitted from the surface and long wavelength rays emitted from deep within the hunk of meat.

There is an absorption of long infrared radiations emitted from the cooling food products which include reduction of the sensible heat from the exterior parts of the food product but the greatest advantage comes when the freezing state is reached and the large amount of ultra long wave length latent heat is liberated.

The carbon blacked cooling plates, cooled by the liquid to perhaps zero Fahrenheit or lower, results in a product freezing stage being reached at a saving of from sixty to eighty percent of the time required for freezing were the cooling plates omitted.

The spraying of the coolant liquid through the spray nozzles 17 against all areas of the polyethylene enwrapped meat as well as against the surfaces of the carbon blacked cold plates as illustrated in FIGURE 2, causes an equivalent saving in freezing time. The pump 14a for causing circulation of the antifreeze solution is shown in FIGURE 2 as a force pump pumping the antifreeze solution to the freezing unit.

While the drawing, shown only in diagrammatic cross section suggests a freezing conveyor, it does not show particularly in FIGURE 1 how the conveyor carries the hunks of meat in a continuous moving arrangement into and out of the liquid bath. Various forms of return loop conveyors as are well known in the industry or as shown in the drawing of my application, Serial No. 709,145, now Patent No. 2,980,544, may be employed.

Since the conveying mechanism forms no part of my invention as disclosed herein only the fundamentals of my new system is indicated. The polyethylene bags in the continuous freezing system contemplated may be removed and used again on fresh hunks of meat as they are conveyed through the freezing apparatus.

Having thus described my invention, what I claim as new and desire to secure by Letters Patent is:

1. In combination with a continuous conveyor for continuously advancing hunks of meat to be frozen, the system which consists in enwrapping the hunks of meat in polyethylene bagging material and conveying them adjacent heat absorbing plates coated with carbon black and chilling the meat and the heat absorbing plates by contact with chilled aqueous non-freezing solution.

2. In combination with a continuous conveyor for continuously advancing hunks of meat to be frozen, the system which consists in enwrapping the hunks of meat in polyethylene bagging material and conveying them adjacent heat absorbing plates coated with carbon black and chilling the meat and the heat absorbing plates by contact with chilled aqueous non-freezing solution, said contact being effected by immersion of the hunks of meat and cooling plates in a bath of said freezing solution.

3. In combination with a continuous conveyor for continuously advancing hunks of meat to be frozen, the system which consists in enwrapping the hunks of meat in polyethylene bagging material and conveying them adjacent heat absorbing plates coated with carbon black and chilling the meat and the heat absorbing plates by contact with chilled aqueous non-freezing solution, said contact being effected by immersion of the hunks of meat and heat absorbing plates in a bath of said freezing solution in which the solution in the bath is circulated through freezing apparatus to maintain the solution at a predetermined temperature.

4. In combination with a continuous conveyor for continuously advancing hunks of meat to be frozen, the system which consists in enwrapping the hunks of meat in polyethylene bagging material and conveying them adjacent heat absorbing plates coated with carbon black and chilling the meat and the heat absorbing plates by spraying the hunks of meat and heat absorbing plates with a chilled non-freezing solution.

5. In combination with a continuous conveyor for continuously advancing hunks of meat to be frozen, the system which consists in enwrapping the hunks of meat in polyethylene bagging material and conveying them adjacent heat absorbing plates coated with carbon black and chilling the meat and the heat absorbing plates by spraying the hunks of meat and heat absorbing plates with a chilled non-freezing solution maintained at a predetermined low temperature by circulation through a freezing unit.

References Cited in the file of this patent

UNITED STATES PATENTS

| | | |
|---|---|---|
| 1,420,740 | Peterson | June 27, 1922 |
| 1,976,448 | Lawler | Oct. 9, 1934 |
| 2,286,225 | Noyes | June 16, 1942 |
| 2,425,714 | Baer | Aug. 19, 1947 |
| 2,662,520 | McMahon | Dec. 15, 1953 |